United States Patent [19]

Lawler

[11] Patent Number: 5,410,674
[45] Date of Patent: Apr. 25, 1995

[54] CIRCUIT FOR CONTROLLING DATA TRANSFER FROM SCSI DISK DRIVE TO VME BUS

[75] Inventor: Edward P. Lawler, Fairport, N.Y.

[73] Assignee: Eastman Kodak Company, Rochester, N.Y.

[21] Appl. No.: 783,653

[22] Filed: Oct. 28, 1991

[51] Int. Cl.[6] .............................................. G06F 5/06
[52] U.S. Cl. .................... 395/500; 364/240.3; 364/239.1; 364/248.1; 364/DIG. 1; 395/250; 395/800
[58] Field of Search ............... 395/250, 325, 500, 800, 395/275

[56] References Cited

U.S. PATENT DOCUMENTS

| | | | |
|---|---|---|---|
| 4,716,525 | 12/1987 | Gilanyi et al. | 395/250 |
| 4,783,705 | 11/1988 | Moon et al. | 360/77.08 |
| 4,805,097 | 2/1989 | DeSanna | 395/400 |
| 4,843,544 | 6/1989 | DuLac et al. | 395/250 |
| 4,847,759 | 6/1989 | Oklobdzija | 395/425 |
| 4,864,291 | 9/1989 | Korpi | 340/825.5 |
| 5,163,131 | 11/1992 | Row et al. | 395/200 |
| 5,222,216 | 6/1993 | Parish et al. | 395/275 |

OTHER PUBLICATIONS

Wescon/89 14 Nov. 1989, San Francisco, Calif., pp. 131-136, J. L. Lin, "Bidirectional FIFO in the Processor-to-Peripheral Communications".
Electronic Design, vol. 35, No. 25, 29 Oct. 1987, Hasbrouck Heights, N.J., pp. 87-90, N. K. Loulou, "SBX Adapter Equips SCSI Bus for Industrial Control Tasks".

Primary Examiner—Parshotam S. Lall
Assistant Examiner—William M. Treat
Attorney, Agent, or Firm—William F. Noval

[57] ABSTRACT

A digital data system includes a circuit for controlling data transfer between a byte wide device, such as a SCSI disk drive, to a four byte wide pathway such as VME bus. The control circuit effects selective control of data transfer of an odd byte, an even byte, a short word (two parallel bytes), or a long word (four parallel bytes). The control circuit includes a FIFO memory, prefetch registers, MUXs, a VME data register, a state machine and DMA controller.

6 Claims, 1 Drawing Sheet

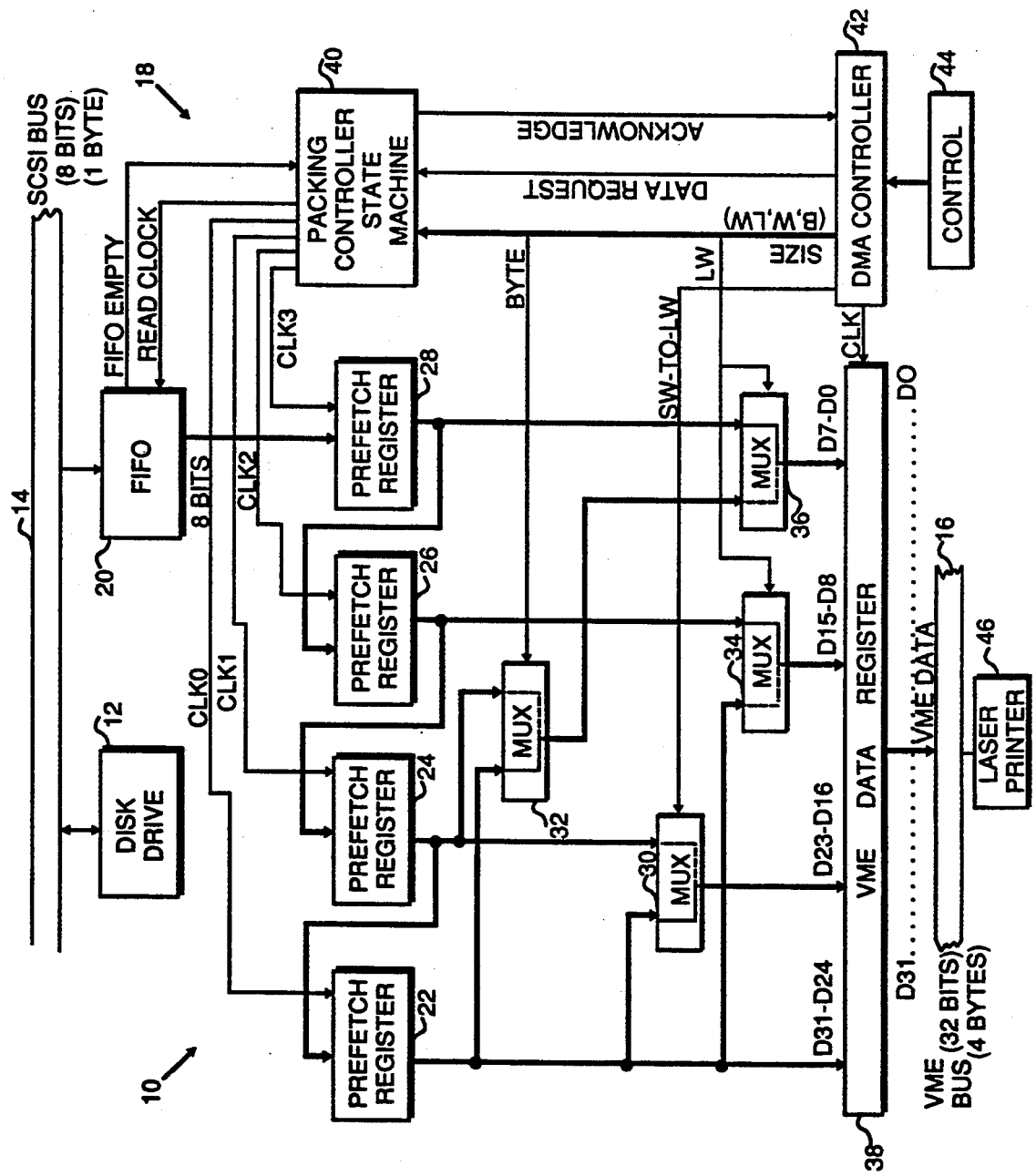

CIRCUIT FOR CONTROLLING DATA TRANSFER FROM SCSI DISK DRIVE TO VME BUS

BACKGROUND OF THE INVENTION

This invention relates in general to digital data systems and more particularly to the control of data transfer from a SCSI disk drive to a VME bus.

A need exists to transfer data between a SCSI (Small Computer Systems Interface) device, such as a disk drive, and a VME bus. This requires adapting the SCSI channel, which is a byte-wide data pathway, to the VME bus, which can be either a byte, short word (2 parallel bytes), or long word (4 parallel bytes) pathway. VME bus byte transfers can occur over two sets of data lines, i.e. D0 through D7 or D8 through D15. Short word transfers use data lines D0 through D15. Long word transfers use data lines D0 through D31. Accordingly, the circuit must accommodate each of these pathways, while maintaining the data in the proper sequence regardless of the width of transfer, or of interleaving of the data widths.

The following patents describe several configurations for effecting data transfer which do not satisfy this need due to undue complexity, excessive cost and/or unreliability.

U.S. Pat. No. 4,843,544, issued Jun. 17, 1989, Inventors DuLac et al;

U.S. Pat. No. 4,847,759, issued Jul. 11, 1989, Inventor Oklobdzija.

U.S. Pat. No. 4,805,097, issued Feb. 14, 1989, Inventor DeSanna;

U.S. Pat. No. 4,864,291, issued Sep. 5, 1989, Inventor Korpi;

U.S. Pat. No. 4,783,705, issued Nov. 8, 1988, Inventors Moon et al.;

U.S. Pat. No. 4,716,525, issued Dec. 9, 1987, Inventors Galanyi et al.

SUMMARY OF THE INVENTION

According to the present invention, there is provided a circuit for controlling data transfer from a byte wide device, such as a SCSI disk drive, to a four byte wide pathway such as a VME bus. The data transfer is effected in a simple, efficient manner for either a data byte, a data short word (2 parallel bytes) or a data long word (4 parallel bytes).

According to an aspect of the present invention, apparatus for controlling data transfer from a byte wide digital device to a four byte wide data pathway includes a FIFO memory which stores data bytes in sequence, prefetch register means which stores up to four data bytes in parallel, multiplexer means, VME data register means and control means. The control means controls transfer of data bytes from a SCSI device sequentially into FIFO memory, from the FIFO into the prefetch register means and then from the prefetch register means into the VME data register means.

According to a further feature of the present invention, there is provided control means including a packing controller state machine and a DMA controller. The packing controller state machine controls sequential transfer of bytes of data from a SCSI device into said FIFO memory and from said FIFO memory selectively into said prefetch register means. The DMA controller controls selective transfer of bytes of data from the prefetch register means to the VME data register via the multiplexer means. Data is transferred to the VME bus from the VME data register. The DMA controller selectively controls transfer of an even or odd byte, a short word (two parallel bytes) or a long word (four parallel bytes from the prefetch buffer means to the VME data register.

BRIEF DESCRIPTION OF THE DRAWINGS

The only FIGURE is a block diagram of a digital data system incorporating an embodiment of the present invention.

DESCRIPTION OF THE PREFERRED EMBODIMENTS

System 10 includes a SCSI bus 14, a VME bus 16 and data transfer control circuit 18. Control circuit 18 includes first-in-first out (FIFO) memory 20; prefetch registers 22, 24, 26 and 28; multiplexers 30, 32, 34 and 36; VME data register 38; packing controller state machine 40; and direct memory access (DMA) controller 42. Master control 44 controls DMA CONTROLLER 42. A laser printer 46 is connected to VME bus 16.

The transfer of data from the SCSI device such as disk drive 12 to VME bus 16 is effected as follows. The data transfer control circuit 18 adapts the byte wide channel of the SCSI disk drive 12 to the byte, short word, and long word capability of the VME bus 16.

In preparation for data transfers, sequential data bytes are transferred over bus 14 from drive 12 to FIFO memory 20, and the STATE MACHINE 40 performs four sequential byte reads of the FIFO memory 20, and simultaneously clocks the four bytes into the PREFETCH REGISTERS 22, 24, 26, 28 (CLK 0, CLK 1, CLK 2, CLK 3). The order in which the bytes pass through the prefetch registers is designed to prepare the data for any forthcoming VME bus 16 write operation, be it byte, short word, or long word transfer type.

The DMA CONTROLLER 42, being programmed by software, requests data from the STATE MACHINE 40, while simultaneously indicating the size of the transfer ("B, W, LW" in the figure refer to Byte, Short Word, and Long Word respectively), and if a Short Word to Long Word expansion is required. A Short Word to Long Word expansion consists of taking the next two sequential bytes (physically located in the two leftmost PREFETCH REGISTERS 22 and 24) and placing them in a long word such that the most significant byte is placed on the D23-D16 input to register 38, while the least significant byte is placed on the D7-D0 input of register 38. The remaining bits of this long word are don't cares (i.e., 1$^s$ or 0$^s$). The Byte, Long Word, and Short Word to Long Word signals from the DMA CONTROLLER 42 control the operation of the MUXs 30, 32, 34, 36 as follows:

1. If a Byte transfer is requested, the MUX 32 connected to the "Byte" signal passes the data from the PREFETCH REGISTER 22 to the D7-D0 input of register 38. This same data simultaneously appears on the D15-D8 input of register 38 via the MUX 34 connected to "LW" since the "LW" signal is inactive. This implementation of byte transfers will automatically accommodate an even or odd byte transfer without the need for additional control signals. (Even byte transfers use the D15-D8 input of register 38, while odd byte transfers use the D7-D0 input of register 38.)

2. If an "LW" (Long Word) transfer is requested, the MUX 34, 36 connected to the "LW" signal passes the data from the two PREFETCH REGISTERS 26 and 28 to the D15-D0 inputs of register 38. Since the "Byte" and "SW-To-LW" signals are both inactive data from PREFETCH REGISTERS 22, 24 pass to the D31-D16 inputs of register 38.

3. If a "SW-To-LW" (Short Word to Long Word expansion) transfer is requested, the MUX 30 connected to the "SW-To-LW" signal passes data from the PREFETCH REGISTER 22 to D23-D16 input of register 38. Since "Byte" and "LW" are both inactive, the data from the PREFETCH REGISTER 24 passes to the D7-D0 input of register 38 through MUX 32 and MUX 36.

Since the data has been prefetched from the FIFO memory 20, the STATE MACHINE 40 immediately acknowledges the request from the DMA CONTROLLER 42.

After the DMA CONTROLLER 42 removes the request, the STATE MACHINE 40 reads additional bytes from the FIFO memory 20 to replace the data taken from the PREFETCH REGISTERS 22, 24, 26, 28. That is, if the transfer just completed was byte wide then only one byte is read from the FIFO memory 20 and simultaneously clocked into the PREFETCH REGISTERS 22, 24, 26, 28. If the transfer was a short word transfer, then two bytes are read from the FIFO memory 20 and simultaneously clocked into the PREFETCH REGISTERS 22, 24, 26, 28. The data transfer control circuit 18 is now ready for another request from the DMA CONTROLLER 42 for any size data; i.e. byte, short word, or long word.

Additional requests from the DMA CONTROLLER 42 are handled by the STATE machine 40, and prefetch of subsequent data follows each request as explained above. This process continues as long as the DMA CONTROLLER 42 continues to request data. If a "Fifo Empty" condition is encountered, the STATE MACHINE 40 will delay the "Acknowledge" signal to the DMA CONTROLLER 42 until the disk drive 12 provides enough data to meet the data size requested.

An advantage of the present invention is that the data is prefetched prior to the request, resulting in higher burst and sustained data rates. That is, the cycle time is reduced because the VME bus 16 write cycle is performed by the DMA CONTROLLER 42 at the same time the STATE MACHINE 40 prepares additional data.

A second advantage of the present invention is that this circuit, by the unique sequence by which the PREFETCH REGISTERS 22, 24, 26, 28 are loaded and the MUXs 30, 32, 34, 36 controlled, quickly provides the data properly positioned for any VME bus 16 size request from the DMA CONTROLLER 42.

A third advantage of the present invention is the use of the Short Word to Long Word expansion mode. The laser printer 46, which contains the herein described circuitry, can print images comprised of 8-bit pixels and images comprised of 12-bit pixels. However, in order to print both pixel widths on the same film, the 8-bit pixels must be located on VME bus 16 word boundaries. That is, each 8-bit pixel must start on a VME bus 16 word boundary even though the data is only 8-bits. The Short Word to Long Word expansion mode allows two pixels to be sent simultaneously over VME bus 16 with each byte positioned on a word boundary. By locating this function in the disk drive 12 output path, the data is not expanded prior to storage on disk, which would require a larger disk storage area. Also, since there are several memory boards which may receive the disk output data, this function is incorporated in one place in hardware, for example on the disk interface board. Therefore, the cost is not incurred on each memory board.

As an example, the PREFETCH REGISTERS 22, 24, 26, 28 are 74ALS374 or equivalent 8-bit registers. The STATE MACHINE 40 is implemented using an ALTERA 5032 or equivalent programmable logic device. The FIFO memory 20 is an IDT7204 9 bit FIFO (only 8-bits are used) providing a "Fifo Empty" external status indication. Each MUX 30, 32, 34, 36 is comprised of two 74ALS257 or equivalent multiplexers, providing 8 channels of 2-to-1 multiplexing.

INDUSTRIAL APPLICATION

The present invention finds application in digital data systems in which a byte size data stored in a SCSI disk drive, or the like, is transferred over a VME or equivalent 4 byte wide data bus to a utilization device, such as a laser printer. The invention has particular application in laser printers used to print on film digital images from medical diagnostic imaging modalities.

The invention has been described in detail herein with reference to the figures, however, it will be appreciated that variations and modifications are possible within the spirit and scope of the invention.

What is claimed is:

1. In a digital data system, apparatus for transferring data from a byte-wide bus to a four byte-wide bus, comprising:

a byte-wide first-in first-out (FIFO) memory for storing sequential bytes of data from said byte-wide bus;

first, second, third, and fourth prefetch registers each of which has an input and an output; wherein the output of said FIFO memory is connected to the input of said fourth prefetch register, and wherein the respective outputs of said fourth, third, and second prefetch registers, are connected respectively to the inputs of said third, second and first prefetch registers;

first, second, third, and fourth multiplexers, each of which has two inputs and an output;

a four-byte wide data register, having first, second, third, and fourth byte-wide inputs and a four byte-wide output connected to said four byte-wide bus;

wherein said output of said first prefetch register is connected (a) to one of the two inputs of said first multiplexer, (b) to one of the two inputs of said second multiplexer, (c) to one of the two inputs of said third multiplexer, and to the first input of said data register; wherein the output of said second prefetch register is connected (a) to the other of said two inputs of said first multiplexer, and (b) to the other of said two inputs of said second multiplexer; wherein the output of said third prefetch register is connected to the other of the two inputs of said third multiplexer; wherein the output of said fourth prefetch register is connected to one of the two inputs of said fourth multiplexer; wherein the output of said first multiplexer is connected to the second input of said data register; wherein the output of said second multiplexer is connected to the other of the two inputs to said fourth multiplexer; wherein the output of said third multiplexer is connected to the third input to said data register; and wherein the output of said fourth multiplexer is connected to the fourth input to said data multiplexer.

2. The apparatus of claim 1 wherein said control means simultaneously controls transfer of data from said digital device to said FIFO memory and from said prefetch register means to said data register means.

3. The apparatus of claim 1 wherein said control means includes a packing controller state machine for controlling transfer of data from a byte wide digital device to said FIFO memory and from said FIFO memory to said prefetch register means and further includes a DMA controller for selectively controlling said multiplexer means to transfer from said prefetch buffer means to said data register means, a data byte, a data short word or a data long word.

4. The apparatus of claim 1 including a SCSI digital device connected to said FIFO memory by means of a byte wide bus and at VME bus connected to said data register means.

5. The apparatus of claim 4 wherein said SCSI digital device is a SCSI disk drive.

6. The apparatus of claim 1 wherein said control means effects expansion of a short word from said prefetch register means into a long word in said data register means for transfer over a four byte wide pathway wherein a data byte of said short word is located on the word boundary of said long word transferred over said four byte pathway.

* * * * *